Nov. 27, 1962   A. P. ADAMSON ETAL   3,065,597
REIGNITABLE SOLID ROCKET MOTOR
Filed Sept. 28, 1959

INVENTORS.
ARTHUR P. ADAMSON
KURT BERMAN
BY
John F. Cullen

United States Patent Office 3,065,597
Patented Nov. 27, 1962

3,065,597
REIGNITABLE SOLID ROCKET MOTOR
Arthur Paul Adamson, Cincinnati, Ohio, and Kurt Berman, Schenectady, N.Y., assignors to General Electric Company, a corporation of New York
Filed Sept. 28, 1959, Ser. No. 843,021
7 Claims. (Cl. 60—35.3)

The present invention relates to a reignitable solid rocket motor and, more particularly, to a controllable solid propellant rocket motor and method of operation thereof which permits it to be turned on and off at will during operation.

There are basically two types of rocket motors in existence today, the liquid propellant type and the solid propellant type. Both types have their advantages and disadvantages. One of the advantages of liquid propellant motors is that the liquid may be easily controlled and turned off to shut the motor down and the motor may be restarted by turning the liquid on again. The disadvantage of the liquid propellant type motor is the difficulty of liquid storage and pumping and the complexity and profusion of parts involved in the control mechanism. On the other hand, solid propellants are useful because of their ease of storage in which the propellants can be cast in a block form, mounted in the rocket engine, and set aside until time for use. The disadvantage is that, once ignited, the propellant burns until exhausted since there is no reliable means to extinguish the rocket and then reignite it. It is felt that a solid propellant rocket propulsion system could become a considerably more practical and versatile means of propulsion if it were provided with a means of accurate, repeatable and reliable thrust termination and restarting means. In the advent of space flight, whether liquid or solid propellants are used, accuracy requires reignitable engines to permit entering an orbit which may not be quite correct, and then making adjustments by firing the engine in short bursts. Additionally, in any system in which it is necessary to fly at a fairly constant velocity, e.g. Mach 2 or above, it is possible to remain at the fairly constant velocity by turning the motor on for a few seconds, turning it off and letting the vehicle coast down and then reigniting to accelerate, etc. It is thus possible to keep the velocity within a desired band. The ability to control the firing and to reignite the solid propellant motor would permit uses not heretofore possible. Normally, the solid propellant continuously burns and the vehicle constantly accelerates until it exhausts the fuel or eventually destroys itself.

A known means of controlling rocket solid propellants has been to provide the combustion chamber with blow-out plugs to reduce the pressure below that at which combustion may be maintained and to time the blow-out to occur at the desired instant. However, this has the disadvantage in that very little control is possible since the plugs cannot be reinserted and the propellant reignited. Also, the fuel remaining after extinguishment is wasted. An additional means has been to provide many separate solid propellant charges and fire them in series in a timed interval. However, such a system lacks the flexibility of the system of the present invention.

The main object of the present invention is to provide a solid propellant rocket motor which may be extinguished and reignited at will during operation.

A further object is to provide such a motor which is inherently inoperable without the addition of an external fluid mass.

A further object is to provide such a motor and a method of operating it which requires the simple operation of a valving mechanism to start and stop the solid propellant combustion at will and provide accurate control.

Briefly stated, the invention discloses a solid propellant motor which is designed to produce combustion products in the combustion chamber at a pressure below a threshold pressure so that combustion is not normally possible. In order to bring up the pressure to the required level, means are provided to introduce into the chamber an additional fluid mass thereby increasing the pressure within the chamber high enough that combustion may be maintained. By maintaining a constant nozzle exit area, combustion is possible during the introduction of the additional mass, and is extinguished, when the external fluid mass is cut off.

While the specification concludes with claims particularly pointed out and distinctly claiming the subject matter which is regarded as the invention, it is believed the invention will be better understood from the following description taken in connection with the accompanying drawing in which:

Figure 1:
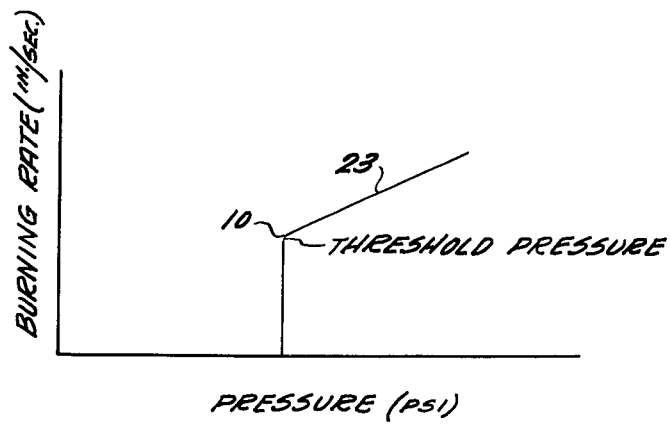
FIG. 1 is a graph illustrating any typical propellant burning characteristic and showing the threshold pressure discussed in connection with the invention.

In the course of solid propellant formulation work, it has been found that certain grains in the solid propellant casting stop burning as the pressure drops below a certain minimum value which is called the "threshold pressure." Most burning processes proceed faster at higher pressure and the burning occurring in the solid propellant rocket is no exception. Thus, a pressure below the threshold pressure is too low to maintain combustion. The curve illustrating this phenomenon is shown in FIG. 1 wherein the burning rate in inches per second is plotted against the chamber pressure in pounds per square inch. As can be seen by referring to FIG. 1, a typical propellant may be extinguished when the threshold pressure 10 is reached. This pressure will depend on the particular propellant used. It is well known that many rocket propellants of the ordinary variety will not burn at low pressure and have to have rather high pressure so that they can burn. This means that if a solid rocket is provided with a certain size throat in the nozzle, it will burn and operate properly. However, if a larger throat is then provided, the pressure drops as the fluids bleed out and the burning is extinguished. Thus, it is possible by dropping the pressure by either blow-out plugs or varying the nozzle, to extinguish this combustion in the combustion chamber. However, most rocket engines have a fixed area nozzle which is much simpler and avoids the complexity of the variable area type. Such a nozzle, of course, does not permit the use of the nozzle as a pressure varying means.

As previously stated, when the pressure is dropped below the minimum value called the threshold pressure, burning stops. Usually this characteristic has been considered undesirable in solid propellants and little effort has been made to develop even an empirical understanding of the various factors which affect the minimum threshold pressure. Neither has any extensive study been made of the characteristics of the minimum threshold pressure, with the idea of making use of these characteristics to construct a controllable solid propellant rocket motor.

In designing a solid propellant motor, the burning surface is usually so designed by known methods that it inherently develops more than the threshold pressure during combustion. This means that if the pressure in the combustion chamber is below the threshold pressure, combustion is not maintained whereas, if above the threshold pressure, combustion is permitted to take place. By intentionally designing the solid propellant to produce combustion products in the chamber at a pressure below the threshold pressure, it is possible to introduce additional mass flow from external sources to increase the internal pressure and raise it above the threshold pressure to permit burning. With a fixed nozzle, it is possible then to provide controlled reignition in solid propellant motors.

In the discussion of the invention, it will be assumed that the usual ignition source is provided although not shown, and the invention directs itself to the means by which control is maintained.

Figure 2:
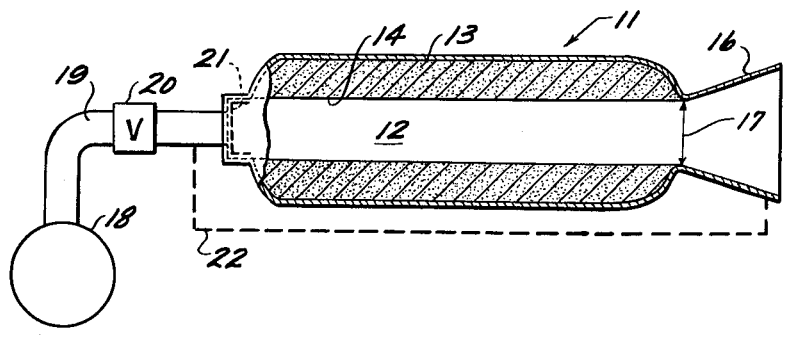
FIG. 2 is a diagrammatic cross-sectional view of a solid propellant rocket motor of the instant invention.

In FIG. 2, there is illustrated a typical diagrammatic showing of a solid propellant rocket motor of the instant invention as generally indicated at 11. This motor 11 consists of the usual combustion chamber 12 lined with a solid propellant 13 and having a burning surface on 14, combustion taking place in this combustion chamber area. To provide for simplicity, a nozzle 16 with a fixed throat area 17 is connected to the combustion chamber. Obviously, the thrust of the burning gases out nozzle 16 produces motion. As previously stated, by designing the solid propellant 13 with the burning surface 14 in such manner, that its combustion products are at a pressure below threshold, then the internal pressure in chamber 12 is insufficient to support combustion and it can be seen that no combustion will take place in motor 11 under normal circumstances.

In order to sustain combustion, it is necessary to increase the mass flow of fluid in chamber 12 and this is done by directing a fluid mass from an external source 18, through pipe connection 19 and valve 20 into the head end of the motor 11. It will be appreciated that the external supply of fluid mass may be obtained from any source 18 and preferably may be a liquid mono-propellant for convenience or the decomposition products thereof which mono-propellant may take the well-known form of hydrogen peroxide. In the event that hydrogen peroxide is used, a screening 21 may be employed to decompose it. Screen 21 will normally be a platinum coated screen to act as a catalyst and increase the rate of decomposition of the hydrogen peroxide, thus directing, in this case, the decomposition products to the chamber. In some cases, it may be desirable to direct the liquid mono-propellant itself to the chamber. If desired, the external fluid may be directed through pipe means 22 as shown diagrammatically, to pass upstream along the surface of the rocket and then entering at the nozzle to provide regenerative cooling in a well-known manner.

The addition of the increased mass from source 18 under the control of valve 20 into chamber 12 increases the pressure within the combustion chamber up to 23 as seen in FIG. 1 so that combustion may now take place. It can be seen that control can be efficiently terminated merely by closing valve 20 by suitable control means to cut off the additional mass flow and lower the pressure in the combustion chamber below the threshold pressure. Thus, a solid reignitable rocket engine is obtainable by the instant invention.

Figure 3:
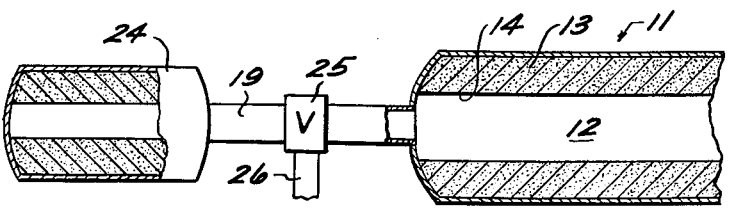
FIG. 3 is a modification of a solid propellant motor similar to FIG. 2.

FIG. 3 illustrates an additional modification of the basic invention wherein the external fluid mass source 24 may be an auxiliary solid propellant charge which in turn is directed by connecting means 19 through valve 25 into motor 11 and combustion area 12 all as previously described. Valve 25 may be conveniently a three-way valve to shut off flow, to permit flow from propellant 24 into chamber 12 to increase the pressure therein to sustain combustion as previously described, and, to vent the extra fluid mass flow through outlet 26 to atmosphere if desired after combustion has taken place in propellant 24 and it is desired to extinguish combustion in motor 11.

Thus, it can be seen that the instant invention permits a relatively simple and straight-forward reignitable solid propellant motor by the expedient of providing additional external fluid mass in order to raise the internal pressure above the threshold pressure and permit combustion to take place.

While there has been hereinbefore described a preferred form of the invention, obviously many modifications and variations of the present invention are possible in the light of the above teachings. It is therefore to be understood that within the scope of the appended claims, the invention may be practiced otherwise than as specifically described.

What we claim is:

1. A controllable solid propellant rocket motor comprising a combustion chamber, a solid propellant charge disposed in said chamber and designed to produce combustion products in said chamber at a pressure below threshold pressure, a nozzle connected to said chamber, and means connected to said chamber to direct additional fluid mass to said chamber to increase said pressure therein above the threshold pressure to support combustion.

2. A controllable solid propellant rocket motor comprising a combustion chamber, a solid propellant charge disposed in said chamber and designed to produce combustion products in said chamber at a pressure below threshold pressure, a fixed area nozzle connected to said chamber, and external means connected to said chamber to direct additional fluid mass to said chamber to increase said pressure therein above the threshold pressure to support combustion, and means to control the admission of said additional mass.

3. Apparatus as described in claim 2 wherein said additional fluid mass directed to said chamber is a liquid mono-propellant.

4. A controllable solid propellant rocket motor comprising, a combustion chamber, a solid propellant charge disposed in said chamber and designed to produce combustion products in said chamber at a pressure below threshold pressure, a fixed area nozzle connected to said chamber, an external fluid mass source, a line connecting said fluid source to said chamber, and a valve in said line whereby said external fluid mass is directed to said chamber under control of said valve to increase the pressure in said chamber above said threshold pressure to support combustion.

5. Apparatus as described in claim 4 wherein said external mass source is an auxiliary solid propellant charge and said valve is a three-way valve to vent to atmosphere, to close said connecting line, and to direct said additional mass to said combustion chamber, thus to control the burning in said combustion chamber.

6. Apparatus as described in claim 4 wherein said external fluid mass source is a liquid mono-propellant.

7. The method of operating a solid propellant rocket motor consisting of designing the solid charge in said motor to have a burning surface to produce products of combustion at a pressure less than the threshold pressure, increasing said pressure above threshold by introducing an external fluid mass to permit combustion, and controlling the combustion by controlling the admission of the external mass at will.

References Cited in the file of this patent

UNITED STATES PATENTS

| | | |
|---|---|---|
| 2,555,333 | Grand et al. | June 5, 1951 |
| 2,791,883 | Moore et al. | May 14, 1957 |
| 2,889,117 | Wimpress | June 2, 1959 |
| 2,906,094 | Damon et al. | Sept. 29, 1959 |
| 2,920,447 | Hollings | Jan. 12, 1960 |